(12) United States Patent
Kataoka et al.

(10) Patent No.: US 11,512,774 B2
(45) Date of Patent: Nov. 29, 2022

(54) ELECTRIC OIL PUMP

(71) Applicant: NIDEC TOSOK CORPORATION, Kanagawa (JP)

(72) Inventors: Shigehiro Kataoka, Kanagawa (JP); Yoshiyuki Kobayashi, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 1022 days.

(21) Appl. No.: 16/217,056

(22) Filed: Dec. 12, 2018

(65) Prior Publication Data

US 2019/0195345 A1 Jun. 27, 2019

(30) Foreign Application Priority Data

Dec. 21, 2017 (JP) .............................. JP2017-245616

(51) Int. Cl.
| | |
|---|---|
| *F16H 61/00* | (2006.01) |
| *B60W 10/30* | (2006.01) |
| *F16H 57/04* | (2010.01) |
| *F01M 1/16* | (2006.01) |
| *F01M 1/02* | (2006.01) |

(52) U.S. Cl.
CPC ......... *F16H 61/0031* (2013.01); *B60W 10/30* (2013.01); *F01M 1/16* (2013.01); *F16H 57/0436* (2013.01); *F16H 57/0441* (2013.01); *F01M 2001/0215* (2013.01)

(58) Field of Classification Search
CPC ............. F16H 61/0031; F16H 57/0436; F16H 57/0441; F01M 1/16; F01M 2001/0215; B60W 10/30
See application file for complete search history.

(56) References Cited

U.S. PATENT DOCUMENTS

| | | | | |
|---|---|---|---|---|
| 3,389,032 A | * | 6/1968 | Black ................. | B29D 30/0061 156/111 |
| 5,372,213 A | * | 12/1994 | Hasebe .................... | B60K 1/02 184/6.12 |
| 2005/0063836 A1 | * | 3/2005 | Kimura ................. | F04C 23/008 417/313 |

(Continued)

FOREIGN PATENT DOCUMENTS

| | | |
|---|---|---|
| JP | H09205758 | 8/1997 |
| JP | 2004047789 | 2/2004 |

(Continued)

*Primary Examiner* — Michael A Riegelman
(74) *Attorney, Agent, or Firm* — JCIPRNET

(57) ABSTRACT

An electric oil pump includes a motor part having a shaft; a pump part that is positioned on one side of the motor part and is driven by the motor part via the shaft and discharges oil; and a control part configured to control an operation of the motor part, wherein the motor part includes a rotor, a stator disposed to face the rotor, and a motor housing, wherein the pump part includes a pump rotor and a pump housing having a housing part, wherein the control part includes a plurality of electronic components and a board, the plurality of electronic components include a heat generating component, wherein the motor housing has a cylindrical part and a plurality of heat dissipating fins that extend from the cylindrical part, wherein the board has a first surface and a second surface, and the heat generating component is mounted on the second surface.

13 Claims, 7 Drawing Sheets

(56) References Cited

U.S. PATENT DOCUMENTS

| | | | |
|---|---|---|---|
| 2011/0280744 A1* | 11/2011 | Ortiz | F04B 53/22 |
| | | | 417/313 |
| 2013/0328424 A1* | 12/2013 | Goto | H02K 11/33 |
| | | | 310/64 |
| 2014/0037472 A1* | 2/2014 | Hibi | F04B 17/03 |
| | | | 417/410.1 |
| 2015/0083649 A1* | 3/2015 | Rosinski | F04C 13/008 |
| | | | 210/136 |
| 2015/0267699 A1* | 9/2015 | Pippes | F04C 15/0046 |
| | | | 417/410.4 |
| 2016/0290581 A1* | 10/2016 | Kim | F21S 41/145 |
| 2018/0179923 A1* | 6/2018 | Shepherd | F01M 1/02 |
| 2019/0195345 A1* | 6/2019 | Kataoka | F16H 61/0031 |
| 2019/0195346 A1* | 6/2019 | Kobayashi | F01M 11/0004 |
| 2019/0195348 A1* | 6/2019 | Kataoka | F01M 1/02 |
| 2019/0195349 A1* | 6/2019 | Kataoka | H02K 5/225 |
| 2019/0301596 A1* | 10/2019 | Kobayashi | F16H 61/0031 |
| 2020/0217309 A1* | 7/2020 | Kataoka | F04B 53/16 |

FOREIGN PATENT DOCUMENTS

| | | |
|---|---|---|
| JP | 2012029793 | 2/2012 |
| JP | 2012149603 | 8/2012 |
| WO | 2012093678 | 7/2012 |
| WO | 2013008266 | 1/2013 |

\* cited by examiner

ELECTRIC OIL PUMP

CROSS REFERENCE TO RELATED APPLICATIONS

The present disclosure claims priority under 35 U.S.C. § 119 to Japanese Application No. 2017-245616 filed on Dec. 21, 2017 the entire content of which is incorporated herein by reference.

BACKGROUND

Technical Field

The disclosure relates to an electric oil pump.

Description of Related Art

An electric oil pump having a structure including a pump part, a motor part configured to drive the pump part, and a control part configured to control an operation of the motor part is known. In this electric oil pump, the pump part is disposed on one side of the motor part in the axial direction and a shaft that extends from the motor part penetrates a pump body of the pump part. On one side end surface of the pump body in the axial direction, a housing part in which one side is open in the axial direction of the pump body and the other side in the axial direction is recessed is provided. A pump rotor is accommodated in the housing part. In addition, the control part has a board on which electronic components that drive the motor part are mounted.

For example, an electric pump including a pump, a motor configured to drive the pump, and a board configured to control the motor may be exemplified. As a technique of the related art using this configuration, an electronic sphygmomanometer may be exemplified. Specifically, an electronic sphygmomanometer has a basic structure including a pump for introducing air into a cuff attached to a part of a subject on which measurement is performed, a pump motor configured to drive the pump, and a board configured to control an electronic sphygmomanometer.

Since a pump of the electronic sphygmomanometer of the related art is driven only during blood pressure measurement for a few minutes, there is no need to consider an influence of heat generated in circuits of the pump of the electronic sphygmomanometer and there is no heat generation countermeasure. On the other hand, the electric oil pump needs to withstand driving for a long time, and a heat generation countermeasure for circuits is necessary according to driving for a long time. Therefore, there is a problem that there is a risk of the requirements for an electric oil pump not being satisfied when a pump in the electronic sphygmomanometer of the related art is applied as an electric oil pump.

SUMMARY

According to an exemplary embodiment of the disclosure, there is provided an electric oil pump including a motor part having a shaft disposed along a central axis that extends in an axial direction; a pump part that is positioned on one side of the motor part in the axial direction and is driven by the motor part via the shaft and discharges oil; and a control part configured to control an operation of the motor part. The motor part includes a rotor fixed to the other side of the shaft in the axial direction, a stator disposed to face the rotor, and a motor housing in which the rotor and the stator are accommodated. The pump part includes a pump rotor attached to the shaft that protrudes from the motor part to one side in the axial direction and a pump housing having a housing part in which the pump rotor is accommodated. The control part includes a plurality of electronic components and a board on which the plurality of electronic components are mounted. The plurality of electronic components include a heat generating component. The motor housing has a cylindrical part in which the rotor and the stator are accommodated and a plurality of heat dissipating fins that extend from the cylindrical part and radially outward from the motor part and extends from the cylindrical part in a circumferential direction of the cylindrical part. The board has a first surface and a second surface. The first surface is a surface that faces the plurality of heat dissipating fins, and the second surface is a surface opposite to the first surface. The heat generating component is mounted on the second surface.

The above and other elements, features, steps, characteristics and advantages of the present disclosure will become more apparent from the following detailed description of the exemplary embodiments with reference to the attached drawings.

DESCRIPTION OF THE EMBODIMENTS

Figure 1:
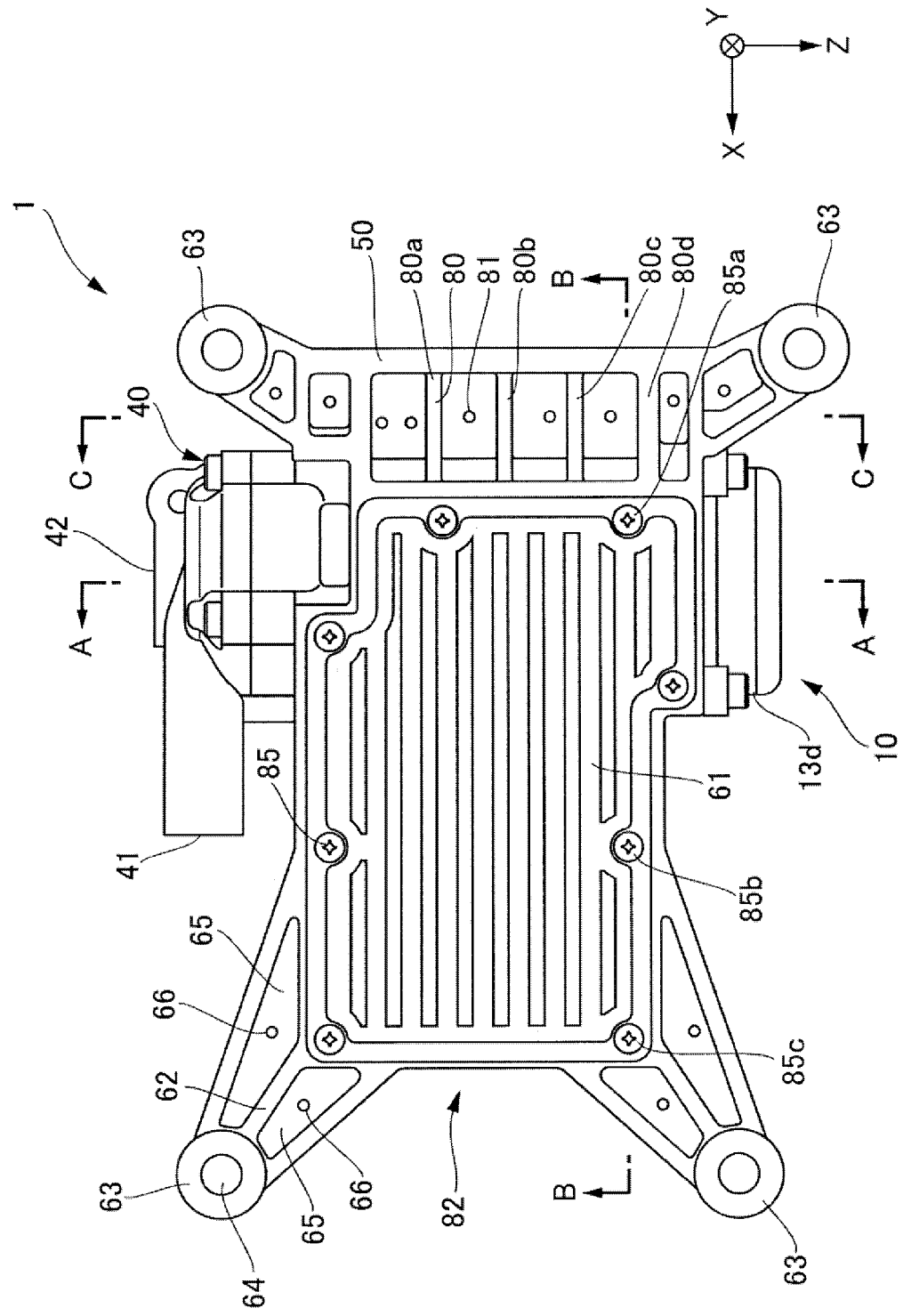
FIG. 1 is a plan view of an electric oil pump according to a first embodiment.

An electric oil pump according to an embodiment of the disclosure will be described below with reference to the drawings. In the present embodiment, an electric oil pump configured to supply oil to a transmission mounted on a vehicle such as an automobile will be described. In addition, in the following drawings, in order to allow respective configurations to be easily understood, actual structures and scales and numbers in the structures may be different therefrom.

In addition, in the drawings, an XYZ coordinate system is appropriately shown as a three-dimensional orthogonal coordinate system. In the XYZ coordinate system, the Z axis direction is a direction parallel to an axial direction of a central axis J shown in FIG. 2 (a vertical direction in FIG. 1). The X axis direction is a direction parallel to a lateral direction of an electric oil pump shown in FIG. 1, that is, a left to right direction in FIG. 1. The Y axis direction is a direction orthogonal to both the X axis direction and the Z axis direction.

In addition, in the following description, the positive side (+Z side) in the Z axis direction will be referred to as "rear side" and the negative side (−Z side) in the Z axis direction will be referred to as "front side." Here, the rear side and the front side are terms that are simply used for explanation, and do not limit actual positional relationships and directions. In addition, unless otherwise noted, a direction (Z axis direction) parallel to the central axis J is simply defined as an "axial direction," a radial direction around the central axis J is simply defined as a "radial direction," and a circumferential direction around the central axis J, that is, a circumference (θ direction) around the central axis J is simply defined as a "circumferential direction."

Here, in this specification, the term "extending in the axial direction" includes not only extending strictly in the axial direction (the Z axial direction) but also extending in a direction inclined in a range of less than 45° with respect to the axial direction. In addition, in this specification, the term "extending in the radial direction" includes not only extending strictly in the radial direction, that is, extending in a direction perpendicular to the axial direction (the Z axial direction), but also extending in a direction inclined in a range of less than 45° with respect to the radial direction.

Figure 2:
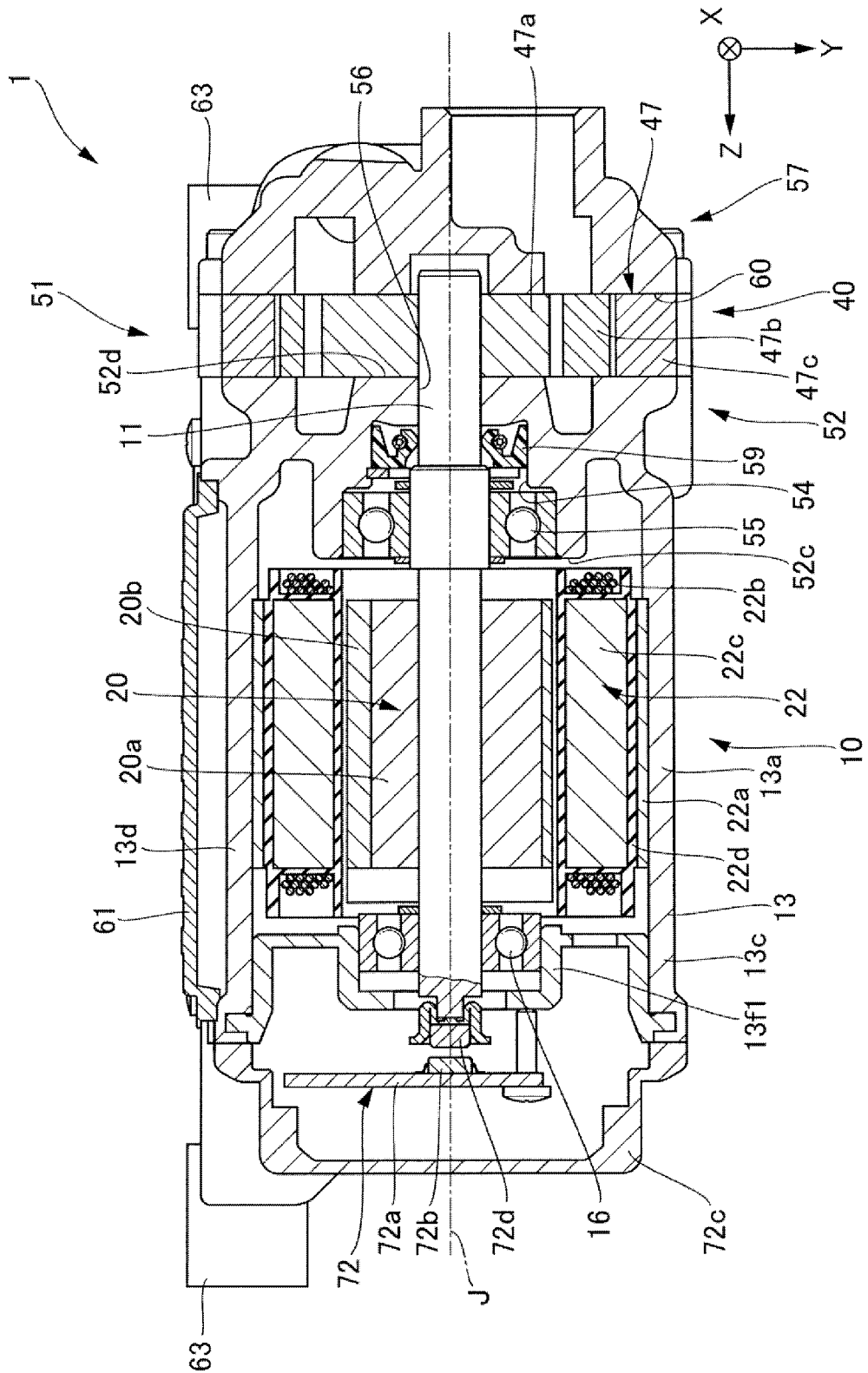
FIG. 2 is a cross-sectional view of the electric oil pump taken along the arrow A-A in FIG. 1.
Figure 3:
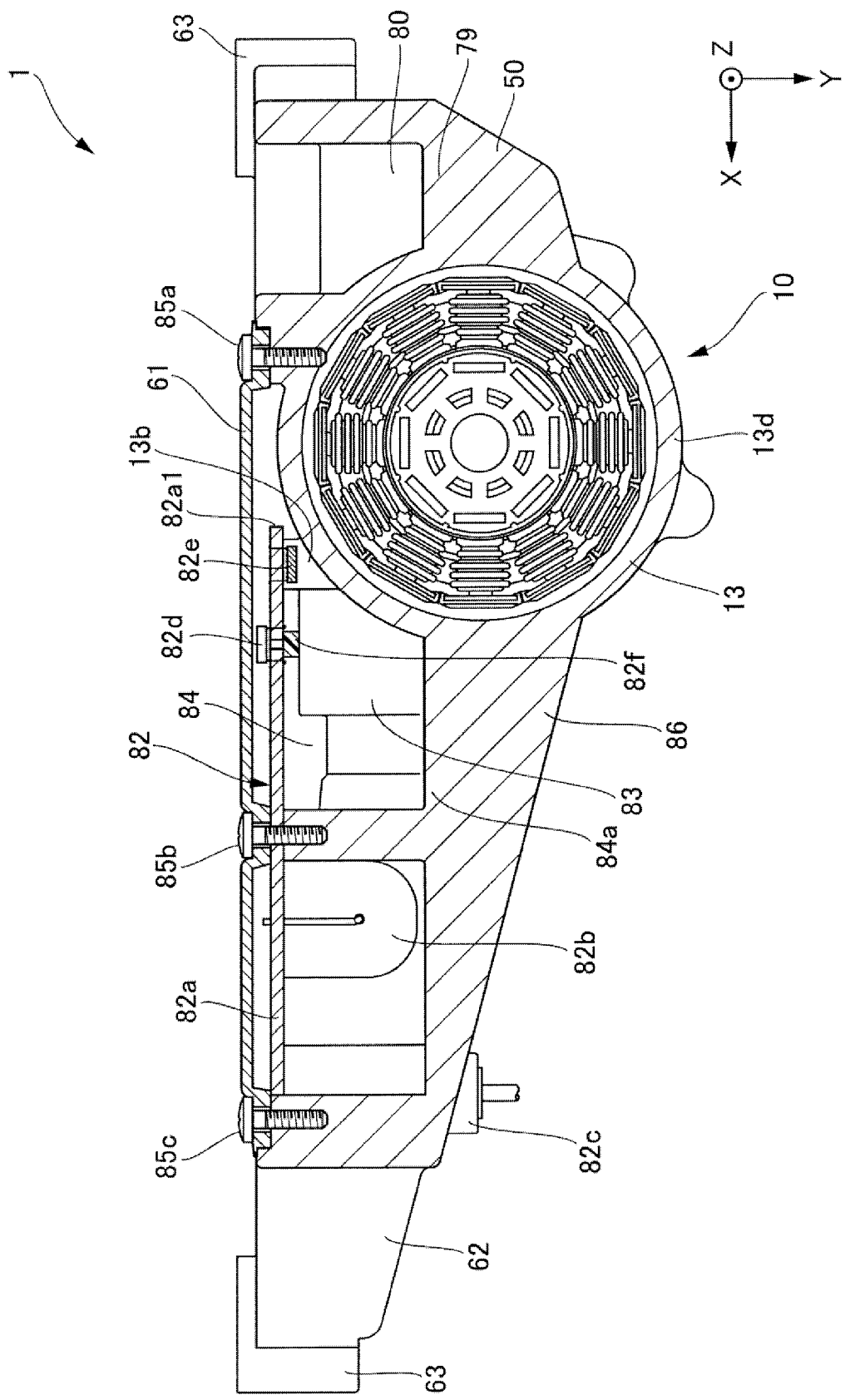
FIG. 3 is a cross-sectional view of the electric oil pump taken along the arrow B-B in FIG. 1.

FIG. 1 is a plan view of an electric oil pump according to a first embodiment. FIG. 2 is a cross-sectional view of an electric oil pump 1 taken along the arrow A-A in FIG. 1. FIG. 3 is a cross-sectional view of the electric oil pump 1 taken along the arrow B-B in FIG. 1. As shown in, FIG. 1, the electric oil pump 1 according to the present embodiment includes a motor part 10, a pump part 40, and a control part 82. The motor part 10 has a shaft 11 that is disposed along the central axis J that extends in the axial direction. The pump part 40 is positioned on one side (front side) of the motor part 10 in the axial direction and is driven by the motor part 10 via the shaft 11, and discharges oil. The control part 82 is disposed between the motor part 10 and a board cover 61 in the Y axis direction and controls an operation of the motor part 10. Constituent members will be described below in detail.

As shown in FIG. 2, the motor part 10 includes the shaft 11, a rotor 20, a stator 22, and a cylindrical part 13d of a motor housing 13.

The motor part 10 is, for example, an inner rotor type motor, the rotor 20 is fixed to the outer circumferential surface of the shaft 11, and the stator 22 is positioned outside the rotor 20 in the radial direction. The rotor 20 is fixed to the other side of the shaft 11 in the axial direction (the rear side with respect to the pump part 40). The stator 22 is disposed to face the rotor 20.

The motor housing 13 includes the cylindrical part 13d having a cylindrical shape that covers the stator 22 and a case 50 that extends in a direction orthogonal to the axial direction from the outer surface of the cylindrical part 13d. The rotor 20 and the stator 22 are accommodated in the cylindrical part 13d. The motor housing 13 includes a stator holding part 13a, a board support 13b, and a holding part 13c. The motor housing 13 is made of a metal. The cylindrical part 13d and the case 50 are integrally molded. Therefore, the cylindrical part 13d and the case 50 are a single member. A motor cover 72c is disposed at an end of the other side (rear side) of the cylindrical part 13d in the axial direction and an opening on the other side (rear side) of the cylindrical part 13d in the axial direction is covered with the motor cover 72c.

The stator holding part 13a has a cylindrical shape that extends in the axial direction. The shaft 11 of the motor part 10, the rotor 20, and the stator 22 are disposed in the stator holding part 13a. The outer surface of the stator 22, that is, the outer surface of a core back part 22a (to be described below), is fitted to an inner circumferential surface 13a1 of the stator holding part 13a. Thereby, the stator 22 is accommodated in the stator holding part 13a.

As shown in FIG. 3, the board support 13b extends radially outward from the cylindrical part 13d of the motor housing 13 and supports a board 82a of the control part 82. The board support 13b is integrally molded with the case 50. Therefore, the board support 13b and the case 50 are a single member.

As shown in FIG. 2, the holding part 13c is provided at the rear side end of the cylindrical part 13d of the motor housing 13. The holding part 13c is integrally molded with the case 50. Therefore, the holding part 13c and the case 50 are a single member. A bearing housing part 13f1 is disposed at and fixed to the rear side end of the cylindrical part 13d of the motor housing 13 which is on the inner side of the holding part 13c in the radial direction. The bearing housing part 13f1 has a shape in which the front side is open and the rear side is recessed. The bearing housing part 13f1 has a circular shape when viewed from the front side. The bearing housing part 13f1 is disposed coaxially with the central axis J of the shaft 11. A bearing 16 provided in the bearing housing part 13f1 supports the rear side end of the shaft 11.

As shown in FIG. 2, the rotor 20 is fixed to the rear side of the shaft 11 with respect to the pump part 40. The rotor 20 includes a rotor core 20a and a rotor magnet 20b. The rotor core 20a surrounds a circumference (θ direction) around the shaft 11 and is fixed to the shaft 11. The rotor magnet 20b is fixed to the outer surface along a circumference (θ direction) around the rotor core 20a. The rotor core 20a and the rotor magnet 20b rotate together with the shaft 11. Here, the rotor 20 may be an embedded magnet type in which a permanent magnet is embedded inside the rotor 20. Compared to a surface magnet type in which a permanent magnet is provided on the surface of the rotor 20, in the embedded magnet type rotor 20, it is possible to reduce a risk of the magnet being peeled off due to a centrifugal force, and it is possible to actively use a reluctance torque.

The stator 22 is disposed to face the rotor 20 outside the rotor 20 in the radial direction and surrounds a circumference (θ direction) around the rotor 20 and rotates the rotor 20 around the central axis J. The stator 22 includes the core back part 22a, a tooth part 22c, a coil 22b, and an insulator (bobbin) 22d.

The shape of the core back part 22a is a cylindrical shape concentric with the shaft 11. The tooth part 22c extends from the inner surface of the core back part 22a toward the shaft 11. A plurality of tooth parts 22c are provided and are disposed at uniform intervals in the circumferential direction on the inner surface of the core back part 22a. The coil 22b is wound around the insulator 22d. The insulator 22d is attached to each of the tooth parts 22c.

As shown in FIG. 2, the shaft 11 extends around the central axis J that extends in the axial direction and penetrates the motor part 10. The front side (−Z side) of the shaft 11 protrudes from the motor part 10 and extends into the pump part 40. The front side of the shaft 11 is fixed to an inner rotor 47a of the pump part 40. The front side of the shaft 11 is supported by a bearing 55 (to be described below). Therefore, the shaft 11 is supported at both ends.

As shown in FIG. 3, the control part 82 includes the board 82a and a plurality of electronic components 82b, 82d, and 82e mounted on the board 82a. The control part 82 generates a signal for driving the motor part 10 and outputs the signal to the motor part 10. The board 82a is supported by and fixed to the board support 13b that extends radially outward from the cylindrical part 13d of the motor housing 13.

As shown in FIG. 2, a detection part 72 is disposed to face the rear side end of the shaft 11 and includes a plate-like circuit board 72a and a rotation angle sensor 72b mounted on the circuit board 72a. The circuit board 72a is supported by and fixed to a board support (not shown) fixed to the rear side end of the cylindrical part 13d of the motor housing 13. A magnet for a rotation angle sensor 72d is disposed at and fixed to the rear side end of the shaft 11. The rotation angle sensor 72b faces the magnet for a rotation angle sensor 72d and is disposed on the rear side of the magnet for a rotation angle sensor 72d. When the shaft 11 rotates, the magnet for a rotation angle sensor 72d also rotates and thereby a magnetic flux changes. The rotation angle sensor 72b detects a change in the magnetic flux due to rotation of the magnet for a rotation angle sensor 72d and thereby detects a rotation angle of the shaft 11.

As shown in FIG. 1 and FIG. 2, the pump part 40 is positioned on one side (front side) of the motor part 10 in the axial direction. The pump part 40 is driven by the motor part 10 via the shaft 11. The pump part 40 includes a pump rotor 47 and a pump housing 51. In the present embodiment, the pump housing 51 includes a pump body 52 and a pump cover 57. The pump housing 51 has a housing part 60 for accommodating the pump rotor 47 between the pump body 52 and the pump cover 57. These components will be described below in detail.

As shown in FIG. 2, the pump body 52 is disposed at the front side end of the cylindrical part 13d of the motor housing 13. The pump body 52 is integrally molded with the case 50. Therefore, the pump body 52 and the case 50 are a single member. The pump body 52 has a concave part 54 that is recessed from an end surface 52c on the rear side (+Z side) to the front side (−Z side). The bearing 55 and a sealing member 59 are sequentially accommodated in the concave part 54 from the rear side to the front side. The bearing 55 supports the shaft 11 that protrudes from the motor part 10 to one side (front side) in the axial direction. The sealing member 59 seals oil leaking from the pump rotor 47.

The pump body 52 is a single member with respect to the motor housing 13. Thereby, the bearing 55 in the concave part 54 is positioned in the axial direction.

The pump body 52 has a through-hole 56 that penetrates along the central axis J. Both ends of the through-hole 56 in the axial direction are open and the shaft 11 passes therethrough, and an opening on the rear side (+Z side) opens to the concave part 54 and an opening on the front side (−Z side) opens to an end surface 52d on the front side of the pump body 52.

As shown in FIG. 2, the pump rotor 47 is attached to the front side of the pump body 52. The pump rotor 47 includes the inner rotor 47a, an outer rotor 47b, and a rotor body 47c. The pump rotor 47 is attached to the shaft 11. More specifically, the pump rotor 47 is attached to the front side (−Z side) of the shaft 11. The inner rotor 47a is fixed to the shaft 11. The outer rotor 47b surrounds the outside of the inner rotor 47a in the radial direction. The rotor body 47c surrounds the outside of the outer rotor 47b in the radial direction. The rotor body 47c is fixed to the pump body 52.

The inner rotor 47a has an annular shape. The inner rotor 47a is a gear having teeth on the outer surface in the radial direction. The inner rotor 47a rotates around a circumference (θ direction) together with the shaft 11. The outer rotor 47b has an annular shape surrounding the outside of the inner rotor 47a in the radial direction. The outer rotor 47b is a gear having teeth on the inner surface in the radial direction. The outer surface of the outer rotor 47b in the radial direction has a circular shape. The inner surface of the rotor body 47c in the radial direction has a circular shape.

The gear on the outer surface of the inner rotor 47a in the radial direction is engaged with the gear on the inner surface of the outer rotor 47b in the radial direction, and the outer rotor 47b is rotated according to rotation of the inner rotor 47a by the shaft 11. That is, the pump rotor 47 rotates according to rotation of the shaft 11. In other words, the motor part 10 and the pump part 40 have the same rotation axis. Thereby, it is possible to prevent the size of the electric oil pump 1 from becoming larger in the axial direction.

In addition, when the inner rotor 47a and the outer rotor 47b rotate, a volume between engaging parts of the inner rotor 47a and the outer rotor 47b changes. An area in which the volume decreases is a pressurized area and an area in which the volume increases is a negative pressure area. An intake port (not shown) of the pump cover 57 is disposed on the front side of the negative pressure area of the pump rotor 47. In addition, a discharge port of the pump cover 57 (not shown) is disposed on the front side of a pressurized area of the pump rotor 47.

As shown in FIG. 2, the pump cover 57 is attached to the front side of the pump rotor 47. The pump cover 57 is fixed to the rotor body 47c of the pump rotor 47. The pump cover 57 is attached and fixed to the pump body 52 together with the rotor body 47c of the pump rotor 47. The pump cover 57 has an intake opening 41 connected to the intake port. The pump cover 57 has a discharge opening 42 connected to the discharge port.

Oil sucked into the pump rotor 47 from the intake opening 41 provided at the pump cover 57 through the intake port of the pump cover 57 is stored in a volume part between the inner rotor 47a and the outer rotor 47b and is sent to the pressurized area. Then, the oil is discharged from the discharge opening 42 provided at the pump cover 57 through the discharge port of the pump cover 57. A direction in which the intake opening 41 is sucked is orthogonal to a direction in which oil is discharged from the discharge opening 42. Thereby, it is possible to reduce a pressure loss from the intake opening to the discharge opening and it is possible to make a flow of oil smooth.

As shown in FIG. 1, the intake opening 41 is disposed on the side in which the board 82a is disposed with respect to the motor part 10. Thereby, an additionally required disposition space is minimized by arranging a disposition space of the intake opening 41 and a disposition space of the board 82a in an overlapping manner and it is possible to reduce the size of the electric oil pump 1 in the radial direction.

The pump part 40, the detection part 72, and the control part 82 are accommodated in the case 50. As shown in FIG. 1 and FIG. 3, the case 50 extends from the cylindrical part 13d of the motor housing 13 in a direction (X direction) orthogonal to the axial direction. As shown in FIG. 1 and FIG. 3, the case 50 has a board housing part 84 in the +X direction of the cylindrical part 13d. Thereby, it is possible to reduce the size of the electric oil pump 1 in a direction (Y direction) orthogonal to the axial direction. The board housing part 84 is integrally molded with the case 50. Therefore, the board housing part 84 and the case 50 are a single member. As shown in FIG. 1 and FIG. 3, the case 50 has a fin part 80 in the −X direction of the cylindrical part 13d. The fin part 80 is integrally molded with the case 50. Therefore, the fin part 80 and the case 50 are a single member. The fin part 80 dissipates heat generated from the electric oil pump 1. While the fin part 80 is disposed on the right side with respect to the cylindrical part 13d and the board housing part 84 is disposed on the left side in FIG. 3, the fin part 80 may be disposed on the left side with respect to the cylindrical part 13d and the board housing part 84 may be disposed on the right side.

Figure 4:
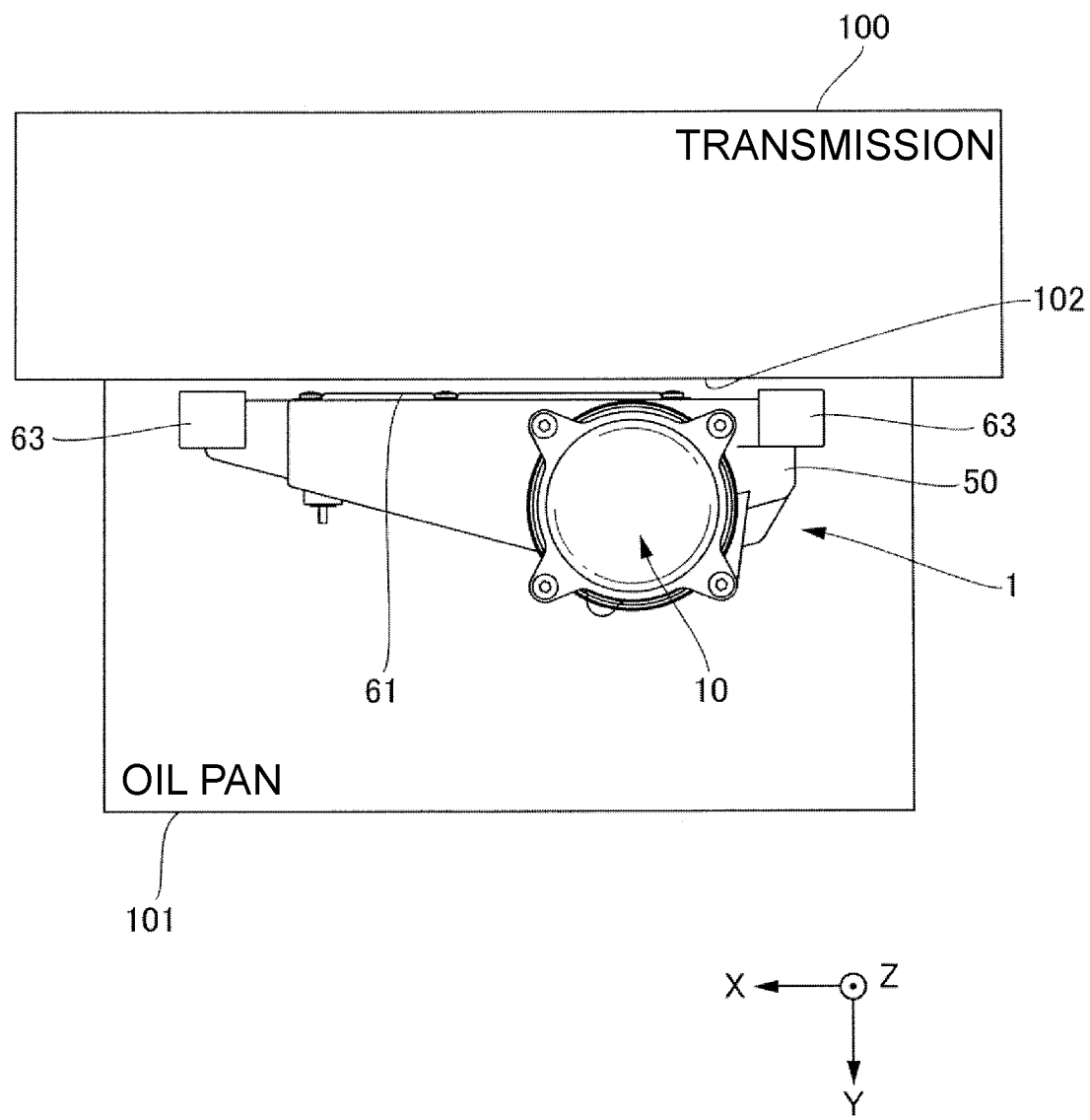
FIG. 4 is a schematic side view showing a state in which the electric oil pump in FIG. 1 is attached to a transmission.

FIG. 4 is a schematic side view showing a state in which the electric oil pump 1 in FIG. 1 is attached to a transmission. As shown in FIG. 4, the electric oil pump 1 is attached to an attachment surface 102 provided on the bottom surface of a transmission 100. The electric oil pump 1 is accommodated in an oil pan 101 provided below the transmission 100. The electric oil pump 1 sucks oil in the oil pan 101 from the intake opening 41 and discharges it from the discharge opening 42. The case 50 of the electric oil pump 1 has a plurality of attachment parts 63 attached to the attachment surface 102 of the transmission 100. The attachment part 63 has an attachment through-hole 64 at the center. A bolt (not shown) passes through the attachment through-hole 64 and the electric oil pump 1 is attached to the attachment surface 102 of the transmission 100 using the bolt. The attachment part 63 has a contact surface that comes in contact with the attachment surface 102 when the electric oil pump 1 is attached to the attachment surface 102.

As shown in FIG. 1, the plurality of attachment parts 63 are provided at four corners on a surface parallel to the attachment surface 102 (a surface that extends in the X direction). A first attachment part among the plurality of attachment parts 63 is disposed on one side with respect to the stator 22 in the axial direction and on one side with respect to the stator 22 in a direction parallel to the surface of the board 82a. A second attachment part among the plurality of attachment parts 63 is disposed on one side with respect to the stator 22 in the axial direction and on the other side with respect to the stator 22 in a direction parallel to the surface of the board 82a. A third attachment part among the plurality of attachment parts 63 is disposed on the other side with respect to the stator 22 in the axial direction and on one side with respect to the stator 22 in a direction parallel to the surface of the board 82a. A fourth attachment part among the plurality of attachment parts 63 is disposed on the other side with respect to the stator 22 in the axial direction and on the other side with respect to the stator 22 in a direction parallel to the surface of the board 82a. The plurality of attachment parts 63 may be three or more attachment parts. Thereby, attachment can be performed with the plurality of attachment parts 63 with high accuracy.

As shown in FIG. 3, the board housing part 84 has a shape in which the side (−Y side) that faces the attachment surface 102 is open and the opposite side (+Y side) is recessed. The board housing part 84 accommodates the board 82a in the recess. The surface of the board 82a is parallel to the axial direction. The board cover 61 covers the board 82a. The board housing part 84 has a support 84a at the bottom of the recess. The support 84a supports a heat dissipating fin 86.

The board cover 61 is disposed at an opening of the board housing part 84 and blocks the opening of the board housing part 84. The board cover 61 is disposed parallel to the board 82a. Thereby, it is possible to reduce the size of the electric oil pump 1 in the direction (Y direction) orthogonal to the axial direction. As shown in FIG. 1, the board cover 61 has a plurality of fixing parts 85 fixed to the case 50. When the electric oil pump 1 is attached to the attachment surface 102 of the transmission 100 by the attachment part 63, the board cover 61 is disposed parallel to the attachment surface 102 of the transmission 100. Thereby, it is possible to reduce the size of the electric oil pump 1 in the direction (Y direction) orthogonal to the axial direction.

As shown in FIG. 1 and FIG. 3, the plurality of fixing parts 85 includes a first fixing part 85a, a second fixing part 85b, and a second fixing part 85c. The first fixing part 85a among the plurality of fixing parts 85 is disposed on one side (−X side) with respect to the shaft 11 in a direction parallel to the board 82a. The second fixing parts 85b and 85c among the plurality of fixing parts 85 are disposed on the other side (+X side) with respect to the shaft 11 in a direction parallel to the board 82a. The plurality of fixing parts 85 are, for example, a bolt. Thereby, the plurality of fixing parts 85 can avoid the position of the shaft 11 in the X direction. The position of the shaft 11 in the X direction is a position at which the motor part 10 is the largest in the Y direction. Accordingly, compared to when the plurality of fixing parts 85 are positioned at the position of the shaft 11 in the X direction, according to the present embodiment, it is possible to reduce the size of the electric oil pump 1 in the direction (Y direction) orthogonal to the axial direction while a sufficient length of the bolt is secured. Thereby, the plurality of fixing parts 85 can fix the board cover 61 more firmly. In addition, Thereby, the board cover 61 can cover the entire board 82a.

Figure 5:
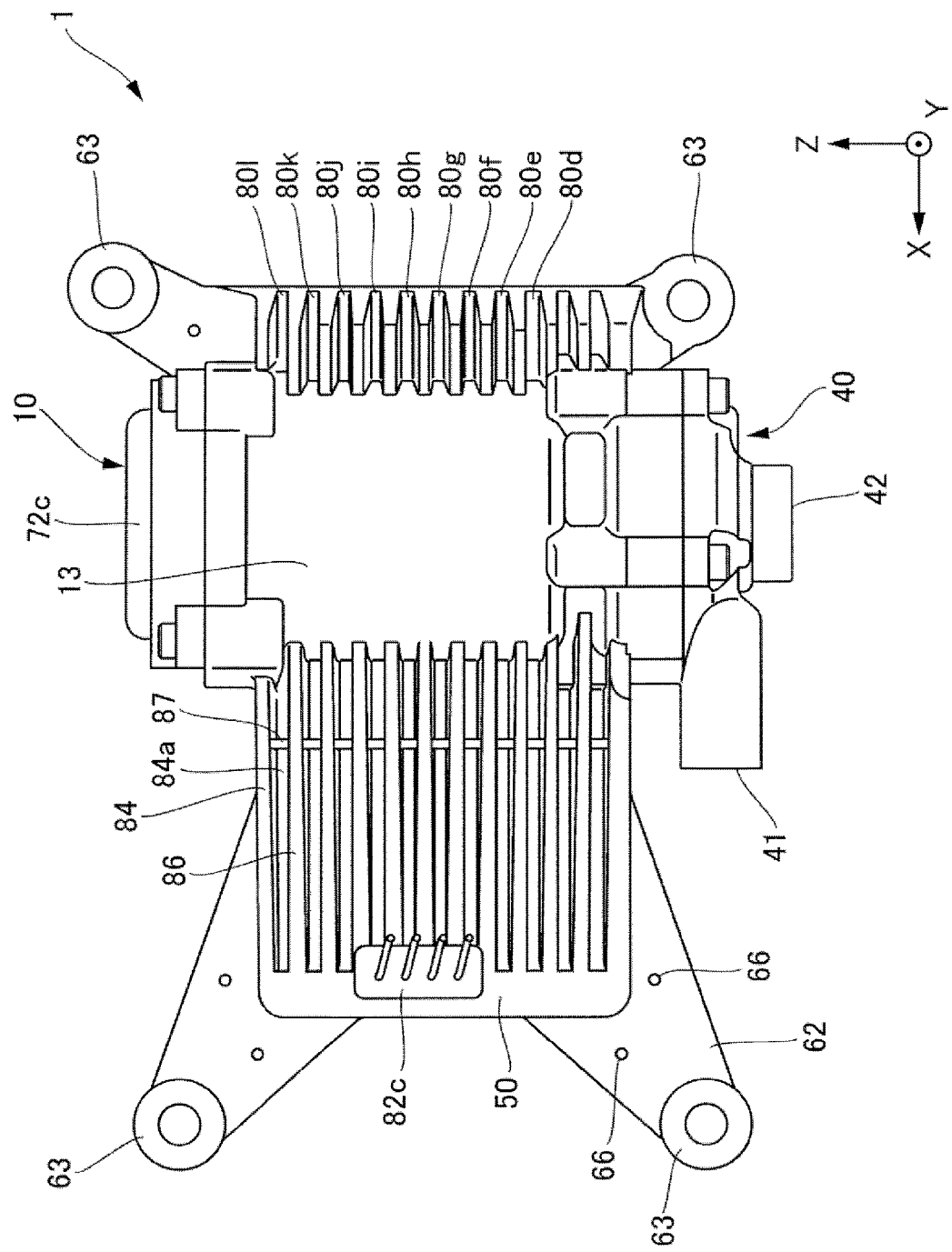
FIG. 5 is a bottom view of the electric oil pump in FIG. 1.

FIG. 5 is a bottom view of the electric oil pump 1 in FIG. 1. The board housing part 84 has a plurality of heat dissipating fins 86 that dissipate heat at an end on the opposite side (+Y side) that faces the attachment surface 102. The plurality of heat dissipating fins 86 are disposed at intervals in the axial direction. The heat dissipating fin 86 is integrally molded with the case 50. Therefore, the heat dissipating fin 86 and the case 50 are a single member.

The heat dissipating fin 86 extends radially outward from the motor part 10 and extends in the circumferential direction of the cylindrical part 13d of the motor housing 13. The heat dissipating fin 86 extends in a direction crossing the axial direction. The heat dissipating fin 86 extends in a direction orthogonal to the axial direction. As shown in FIG. 3, the length of the heat dissipating fin 86 in the circumferential direction is longer on a radially inner side than on a radially outer side. The board housing part 84 has the support 84a at an end on the side (−Y side) that faces the board 82a of the heat dissipating fin 86. The support 84a is integrally molded with the case 50. Therefore, the support 84a and the case 50 are a single member. The support 84a supports the heat dissipating fin 86. The support 84a is a plate-like member that extends radially outward from the cylindrical part 13d of the motor housing 13 and in the axial direction. The support 84a extends in the axial direction and thus connects the heat dissipating fins 86 adjacent in the axial direction. Thereby, it is possible to reduce swinging of the respective heat dissipating fins 86 in the axial direction, and it is possible to increase the strength of the heat dissipating fin 86 in the axial direction. The support 84a extends to the outside in the radial direction and thus connects the heat dissipating fins 86 adjacent in the axial direction also on the outside in the radial direction. Thereby, it is possible to reduce swinging of the respective heat dissipating fins 86 in the axial direction also on the outside in the radial direction, and it is possible to increase the strength of the heat dissipating fins 86 in the axial direction. Here, according to the strength of the heat dissipating fin 86 in the axial direction, swinging of the heat dissipating fins 86 in the axial direction is reduced. The support 84a extends in a radially outward direction and in the axial direction and thus heat generated from the control part 82 can be received in a larger area compared to when the support 84a is not provided, heat is efficiently transferred to the heat dissipating fin 86, and a heat dissipation effect can be improved. As shown in FIG. 3, the support 84a has a heat transfer part 83 that extends toward the board 82a. The heat transfer part 83 is integrally molded with the case 50. Therefore, the heat transfer part 83 and the case 50 are a single member. The heat transfer part 83 is a columnar member that extends from the support 84a toward the board 82a. The heat transfer part 83 may have, for example, a prismatic shape or a columnar shape. A distance between an end on the side of the board 82a of the heat transfer part 83 and the board 82a is shorter than a distance between the support 84a and the board 82a. Thereby, compared to when the heat transfer part 83 is not provided, according to the present embodiment, heat generated from the control part 82 is easily received by the heat transfer part 83, heat is efficiently transferred to the support 84a and the heat dissipating fin 86, and a heat dissipation effect can be improved.

As shown in FIG. 5, the board housing part 84 has a rib 87 connecting the plurality of heat dissipating fins 86. The rib 87 is a columnar member that extends from the support 84a to the side (+Y side) opposite to the board 82a. The rib 87 may have, for example, a prismatic shape or a columnar shape. The rib 87 extends from the support 84a. Thereby, the rib 87 serves as a path through which heat received in the support 84a is transferred to the heat dissipating fin 86 and it is possible to further increase heat dissipation efficiency by the heat dissipating fin 86. The rib 87 connects a surface of the heat dissipating fin 86 in the axial direction and a surface of the adjacent heat dissipating fin 86 in the axial direction. Thereby, it is possible to reduce swinging of the respective heat dissipating fins 86 in the axial direction, and it is possible to increase the strength of the heat dissipating fins 86 in the axial direction. Here, according to the strength of the heat dissipating fin 86 in the axial direction, swinging of the heat dissipating fins 86 in the axial direction is reduced. The rib 87 is integrally molded with the case 50. Therefore, the rib 87 and the case 50 are a single member.

As shown in FIG. 3, the board 82a has an end 82a1. The end 82a1 of the board 82a is disposed at a position overlapping the cylindrical part 13d of the motor housing 13 in a direction orthogonal to the surface of the board 82a. Thereby, it is possible to reduce the size of the electric oil pump 1 in the direction (X direction) orthogonal to the axial direction. The electronic component 82b, the electronic component 82d, the electronic component 82e and a connector 82c are mounted on the board 82a. The electronic component 82b, the electronic component 82d, and the electronic component 82e are a plurality of electronic components.

The electronic component 82e which is shorter in height than the electronic component 82b (the height from the board 82a is lower) is mounted on a surface that faces the motor part 10 within the surface of the board 82a at a position overlapping the cylindrical part 13d of the motor housing 13 in a direction orthogonal to the surface of the board 82a. Thereby, a position that faces the motor part 10 of the board 82a can be used as a component mounting area, it is possible to reduce the size of the board 82a, and it is possible to reduce the size of the electric oil pump 1.

On a surface that faces the motor part 10 within the surface of the board 82a at a position overlapping the cylindrical part 13d of the motor housing 13 in a direction orthogonal to the surface of the board 82a, the electronic component 82b which is taller in height than the electronic component 82e (the height from the board 82a is higher) cannot be mounted because the height serves as an obstacle. Thereby, it is possible to reduce the size of the electric oil pump 1 in the direction (Y direction) orthogonal to the axial direction.

The electronic component 82b is mounted on a surface that faces the motor part 10 within the surface of the board 82a at a position not overlapping the cylindrical part 13d of the motor housing 13 in a direction orthogonal to the surface of the board 82a. The electronic component 82b is mounted radially outward from a mounting position of the electronic component 82e. The electronic component 82e has a higher heat resistance than the electronic component 82b. The electronic component 82e is, for example, a resistor. Thereby, a resistor having a high heat resistance which is short in height can be efficiently mounted near the motor part 10. The electronic component 82b is, for example, an electrolytic capacitor. Thereby, it is possible to efficiently mount an electrolytic capacitor which is tall in height and it is possible to keep an electrolytic capacitor having a low heat resistance away from heat generated from the motor part 10.

The connector 82c is mounted on a surface that faces the motor part 10 within the surface of the board 82a at a position not overlapping the cylindrical part 13d of the motor housing 13 in a direction orthogonal to the surface of the board 82a. The connector 82c is taller in height than the electronic component 82b (the height from the board 82a is higher). The connector 82c is mounted radially outward from a mounting position of the electronic component 82b. Thereby, it is possible to efficiently mount the connector 82c which is tall in height.

The electronic component 82d is mounted on a surface opposite to a surface that faces the motor part 10 within the surface of the board 82a. The board 82a has a first surface and a second surface. The first surface of the board 82a is a surface that faces the plurality of heat dissipating fins 86. The first surface of the board 82a is a surface that faces the support 84a. The second surface of the board 82a is a surface opposite to the first surface of the board 82a. As shown in FIG. 3, the electronic component 82d is mounted on the second surface of the board 82a. The electronic component 82d is a power semiconductor element for controlling power that drives the motor part 10. The electronic component 82d is a field effect transistor (FET) or an insulated gate bipolar transistor (IGBT). The electronic component 82d is a heat generating component that is more likely to generate heat than other components.

Figure 6:
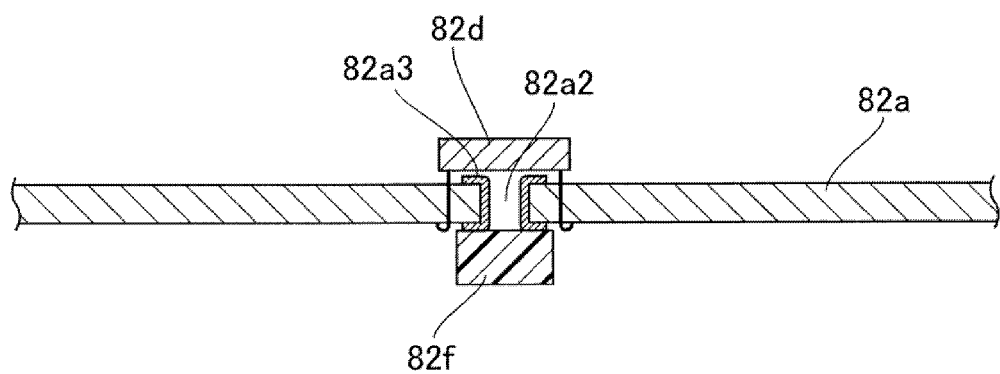
FIG. 6 is an enlarged view of an electronic component 82d shown in FIG. 3 and is a cross-sectional view at the position of the electronic component 82d.

FIG. 6 is an enlarged view of the electronic component 82d shown in FIG. 3 and is a cross-sectional view at the position of the electronic component 82d. The board 82a has a board through-hole 82a2 that penetrates from the second surface of the board 82a to the first surface at a position that faces the electronic component 82d. Heat generated from the electronic component 82d is dissipated from the second surface of the board 82a to the first surface through the board through-hole 82a2. A thermally conductive member 82a3 having thermal conductivity is provided on the inner circumference of the board through-hole 82a2. The thermally conductive member 82a3 is, for example, a copper foil. Thereby, it is possible to efficiently dissipate heat generated from the electronic component 82d.

As shown in FIG. 6, a heat dissipation member 82f is provided on the first surface of the board 82a. The heat dissipation member 82f is provided at a position at which the board through-hole 82a2 is covered. The heat dissipation member 82f is a member having thermal conductivity. Thereby, it is possible to efficiently dissipate heat generated from the electronic component 82d. The heat dissipation member 82f is an insulating member. As shown in FIG. 3, the heat dissipation member 82f is in contact with the board 82a on the −Y side and is in contact with the heat transfer part 83 on the +Y side. Thereby, it is possible to efficiently dissipate heat generated from the electronic component 82d.

Figure 7:
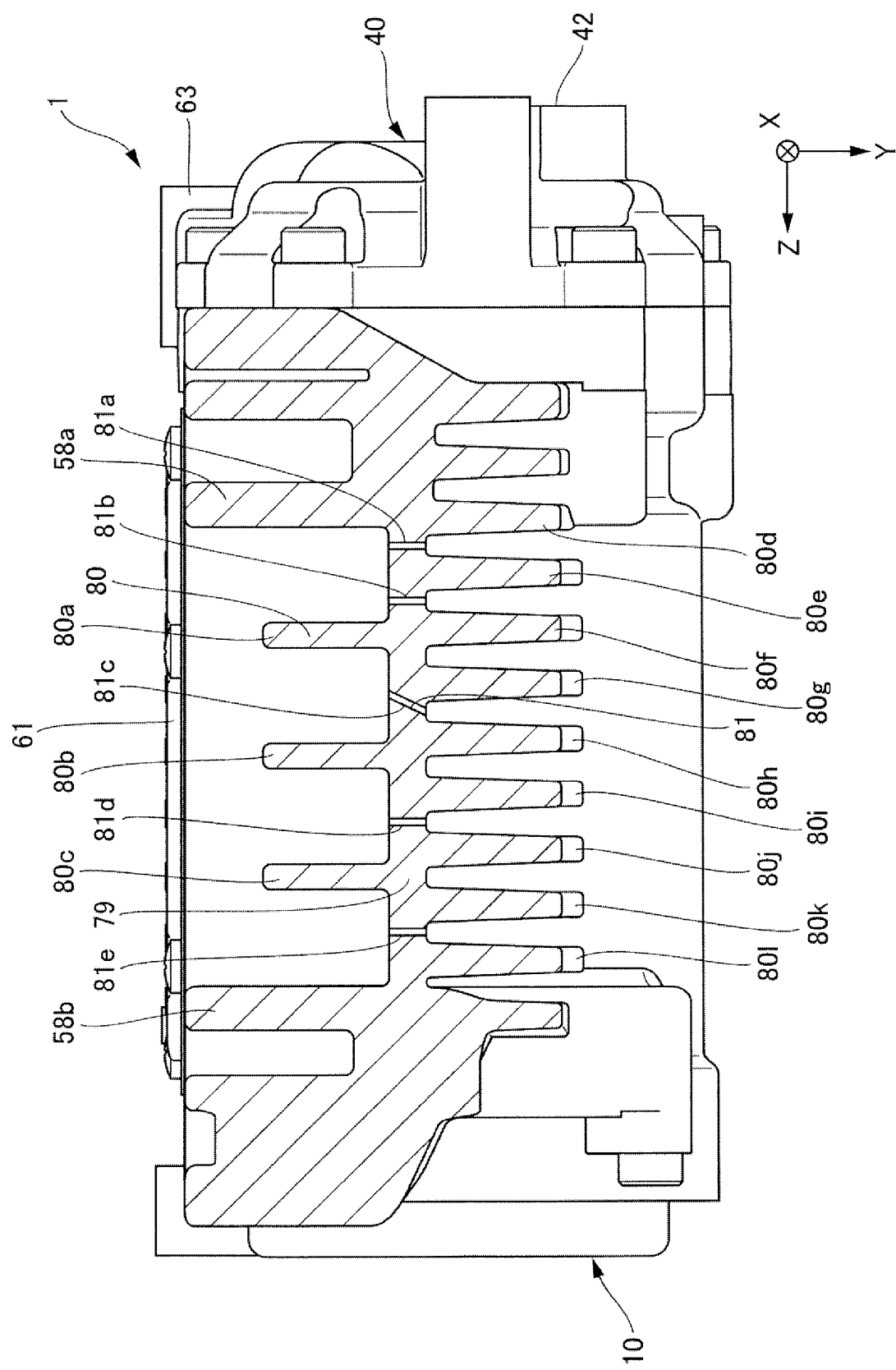
FIG. 7 is a cross-sectional view of the electric oil pump taken along the arrow C-C in FIG. 1.

FIG. 7 is a cross-sectional view of the electric oil pump 1 taken along the arrow C-C in FIG. 1. The fin part 80 has a fin support 79. The fin support 79 extends radially outward from the cylindrical part 13d of the motor housing 13. The fin part 80 includes a heat dissipating fin 80a, a heat dissipating fin 80b adjacent to the heat dissipating fin 80a, a heat dissipating fin 80c adjacent to the heat dissipating fin 80b, a heat dissipating fin 80d, a heat dissipating fin 80e adjacent to the heat dissipating fin 80d, a heat dissipating fin 80f adjacent to the heat dissipating fin 80e, a heat dissipating fin 80g adjacent to the heat dissipating fin 80f, a heat dissipating fin 80h adjacent to the heat dissipating fin 80g, a heat dissipating fin 80i adjacent to the heat dissipating fin 80h, a heat dissipating fin 80j adjacent to the heat dissipating fin 80i, a heat dissipating fin 80k adjacent to the heat dissipating fin 80j, and a heat dissipating fin 80l adjacent to the heat dissipating fin 80k. The fin support 79 and the heat dissipating fins 80a to 80l are integrally molded with the case 50. Therefore, the fin support 79, the heat dissipating fins 80a to 80l, and the case 50 are a single member.

The case 50 has an end 58a adjacent to the heat dissipating fin 80a on one side (front side) in the axial direction and an end 58b adjacent to the heat dissipating fin 80c on the other side (rear side) in the axial direction. The ends 58a and 58b are integrally molded with the case 50. Therefore, the ends 58a and 58b, and the case 50 are a single member.

The heat dissipating fins 80a to 80l extend radially outward from the cylindrical part 13d of the motor housing 13 and extend in the circumferential direction of the cylindrical part 13d. The heat dissipating fins 80a to 80c extend from the fin support 79 in the direction (−Y direction) orthogonal to the axial direction. The heat dissipating fins 80d to 80l extend from the fin support 79 in the direction (+Y direction) orthogonal to the axial direction. The fin support 79 supports the heat dissipating fins 80a to 80l. The heat dissipating fins 80a to 80l are disposed at intervals in the axial direction.

As shown in FIG. 1 and FIG. 7, the fin support 79 has a plurality of inter-fin through-holes 81 that penetrate in the direction (Y direction) orthogonal to the axial direction. The plurality of inter-fin through-holes 81 include a first inter-fin through-hole 81a, a second inter-fin through-hole 81b, a third inter-fin through-hole 81c, a fourth inter-fin through-hole 81d, and a fifth inter-fin through-hole 81e. The first inter-fin through-hole 81a and the second inter-fin through-hole 81b are provided on the surface of the fin support 79 between the end 58a and the heat dissipating fin 80a. The first inter-fin through-hole 81a penetrates between the heat dissipating fin 80d and the heat dissipating fin 80e. The second inter-fin through-hole 81b penetrates between the heat dissipating fin 80e and the heat dissipating fin 80f. The third inter-fin through-hole 81c is provided on the surface of the fin support 79 between the heat dissipating fin 80a and the heat dissipating fin 80b. The third inter-fin through-hole 81c penetrates between the heat dissipating fin 80g and the heat dissipating fin 80h. The fourth inter-fin through-hole 81d is provided on the surface of the fin support 79 between the heat dissipating fin 80b and the heat dissipating fin 80c. The fourth inter-fin through-hole 81d penetrates between the heat dissipating fin 80i and the heat dissipating fin 80j. The fifth inter-fin through-hole 81e is provided on the surface of the fin support 79 between the heat dissipating fin 80c and the end 58b. The fifth inter-fin through-hole 81e penetrates between the heat dissipating fin 80l and the heat dissipating fin 80l.

The plurality of inter-fin through-holes 81 function as an oil loophole. As shown in FIG. 4, the electric oil pump 1 is attached to the lower side of the transmission 100, and oil supplied from the discharge opening 42 to the transmission 100 flows down to the upper part of the electric oil pump 1. The plurality of inter-fin through-holes 81 serve as a flow path through which oil flowing down to the upper part of the electric oil pump 1 flows to the lower side of the electric oil pump 1 without remaining in the electric oil pump 1.

The third inter-fin through-hole 81c and the fifth inter-fin through-hole 81e are disposed at a central part between a pair of heat dissipating fins adjacent to the axial direction. Thereby, it is possible to flow oil downward more smoothly. Like the first inter-fin through-hole 81a and the second inter-fin through-hole 81b, a plurality of through-holes may be provided between a pair of heat dissipating fins adjacent in the axial direction. A direction of the first inter-fin through-hole 81a, the second inter-fin through-hole 81b, the fourth inter-fin through-hole 81d, and the fifth inter-fin through-hole 81e extends in a direction orthogonal to the attachment surface 102 (in other words, a direction orthogonal to a contact surface of the attachment part 63 that comes in contact with the attachment surface 102 of the transmission 100). Thereby, it is possible to flow oil downward more smoothly. Like the third inter-fin through-hole 81c, a direction thereof may extend in a direction crossing the attachment surface 102 rather than a direction orthogonal to the attachment surface 102.

The plurality of inter-fin through-holes 81 may be disposed on the outside in the radial direction within the surface of the fin support 79. Thereby, it is possible to increase the strength of the motor part in the axial direction and an operation of forming a through-hole can be easily performed by a tool.

The surface of the fin support 79 between adjacent heat dissipating fins may be inclined toward an opening of the inter-fin through-hole 81. Thereby, it is possible to flow oil downward more smoothly. The inter-fin through-hole 81 has a circular cross-sectional shape in a direction orthogonal to a penetration direction. Thereby, it is possible to flow oil downward more smoothly.

The fin support 79 has a first surface and a second surface. The first surface of the fin support 79 is a surface between a pair of heat dissipating fins adjacent in the axial direction. The second surface of the fin support 79 is a surface opposite to the first surface of the fin support 79. The size of the inner diameter of the inter-fin through-hole 81 decreases from the first surface of the fin support 79 to the second surface of the fin support 79. Thereby, when a tool is inserted from the first surface of the fin support 79 and the inter-fin through-hole 81 is formed, the tool is easily pulled out and the inter-fin through-hole 81 is easily formed.

In the electric oil pump 1, a part in which there is a risk of oil flowing down to the upper part remaining is not limited to a part between a pair of heat dissipating fins adjacent in the axial direction. Desirably, a through-hole is provided as an oil loophole in all parts in which there is a risk of oil flowing down to the upper part remaining. For example, a groove through-hole 66 is provided at an arm 62 of the attachment part 63 shown in FIG. 1.

The attachment part 63 has the arm 62 that extends toward the stator 22. The arm 62 has a groove 65 that is open in a direction orthogonal to a contact surface of the attachment part 63 that comes in contact with the attachment surface 102 of the transmission 100. The groove through-hole 66 is provided at the bottom of the groove 65. The groove through-hole 66 serves as a flow path through which oil flowing down to the upper part of the electric oil pump 1 flows to the lower side of the electric oil pump 1 without remaining in the electric oil pump 1.

Next, actions and effects of the electric oil pump 1 will be described. As shown in FIG. 1 and FIG. 2, when the motor part 10 of the electric oil pump 1 is driven, the shaft 11 of the motor part 10 rotates, and the outer rotor 47b also rotates as the inner rotor 47a of the pump rotor 47 rotates. When the pump rotor 47 rotates, oil sucked from the intake opening 41 of the pump part 40 moves into the housing part 60 of the pump part 40, and is discharged from the discharge opening 42.

(1) Here, in the electric oil pump 1 according to the present embodiment, the electronic component 82d as a heat generating component is mounted on a surface (second surface) opposite to a surface (first surface) that faces the heat dissipating fin 86 within the surface of the board 82a. Accordingly, it is possible to efficiently dissipate heat generated on the surface opposite to the mounting surface which is heat generated from the electronic component 82d through the heat dissipating fin 86. Thereby, a heat generation countermeasure can be applied to the electric oil pump 1.

(2) In addition, the motor housing 13 has the support 84a that supports the heat dissipating fin 86. When the support 84a extends to the outside in the radial direction and the axial direction, heat generated from the control part 82 can be received in a larger area compared to when the support 84a is not provided, heat is efficiently transferred to the heat dissipating fin 86, and a heat dissipation effect can be improved. Accordingly, it is possible to further improve a heat dissipation effect with the support 84a. In addition, when the support 84a extends in the axial direction, the heat dissipating fins 86 adjacent in the axial direction are connected. Accordingly, it is possible to reduce swinging of the respective heat dissipating fins 86 in the axial direction, and it is possible to increase the strength of the heat dissipating fins 86 in the axial direction. Here, according to the strength of the heat dissipating fins 86 in the axial direction, swinging of the heat dissipating fins 86 in the axial direction is reduced.

(3) In addition, the support 84a extends to the outside in the radial direction and thus connects the heat dissipating fins 86 adjacent in the axial direction also on the outside in the radial direction. Accordingly, it is possible to reduce swinging of the respective heat dissipating fins 86 in the axial direction also on the outside in the radial direction, and it is possible to increase the strength of the heat dissipating fins 86 in the axial direction. Here, according to the strength of the heat dissipating fins 86 in the axial direction, swinging of the heat dissipating fins 86 in the axial direction is reduced.

(4) In addition, the support 84a has the heat transfer part 83 that extends toward the board 82a. A distance between an end on the side of the board 82a of the heat transfer part 83 and the board 82a is shorter than a distance between the support 84a and the board 82a. Accordingly, compared to when the heat transfer part 83 is not provided, heat generated from the control part 82 is easily received by the heat transfer part 83, heat generated from the electronic component 82d on the surface opposite to the mounting surface for the electronic component 82d as a heat generating component is transferred through the heat transfer part 83 and heat can be efficiently dissipated.

(5) In addition, the board 82a has the board through-hole 82a2 that penetrates from the mounting surface for the heat generating component to the surface opposite to the mounting surface for the heat generating component. Air can flow from the mounting surface for the heat generating component to the surface opposite to the mounting surface for the heat generating component through the board through-hole 82a2. According to this air flow, heat can be transferred more efficiently from the mounting surface for the heat generating component to the surface opposite to the mounting surface for the heat generating component. Accordingly, heat generated from the electronic component 82d as a heat generating component can be efficiently dissipated from the mounting surface for the electronic component 82d to the surface opposite to the mounting surface through the board through-hole 82a2.

(6) In addition, the board through-hole 82a2 has the thermally conductive member 82a3 having thermal conductivity on its inner circumference. The thermally conductive member 82a3 has higher thermal conductivity than the board 82a. Heat can be transferred more efficiently from the mounting surface for the heat generating component to the surface opposite to the mounting surface for the heat generating component through the thermally conductive member 82a3. Accordingly, heat can be efficiently dissipated from the mounting surface for the electronic component 82d to the surface opposite to the mounting surface through the thermally conductive member on the inner circumference of the board through-hole 82a2.

(7) In addition, the board through-hole 82a2 has a copper foil having high thermal conductivity on its inner circumference. Heat can be transferred more efficiently from the mounting surface for the heat generating component to the surface opposite to the mounting surface for the heat generating component through the copper foil. Accordingly, heat can be efficiently dissipated from the mounting surface for the electronic component 82d to the surface opposite to the mounting surface through the copper foil on the inner circumference of the board through-hole 82a2.

(8) In addition, the board 82a has the heat dissipation member 82f on the surface opposite to the heat dissipating fin 86. Compared to when the heat dissipation member 82f is not provided, the heat dissipation member 82f can more efficiently receive heat of the board 82a. Accordingly, heat can be dissipated more efficiently on the surface opposite to the mounting surface for the electronic component 82d.

(9) In addition, the heat dissipation member 82f comes in contact with the heat transfer part 83. When the heat dissipation member 82f comes in contact with the heat transfer part 83, heat received by the heat dissipation member 82f from the board 82a can be dissipated more efficiently toward the heat transfer part 83. Accordingly, heat can be dissipated more efficiently on the surface opposite to the mounting surface for the electronic component 82d.

(10) In addition, the length of the heat dissipating fin 86 in the circumferential direction is longer on a radially inner side than on a radially outer side. Accordingly, heat generated from the motor part 10 can be efficiently received in a radially inward direction in which the length of the heat dissipating fin 86 in the circumferential direction is long, and heat generated from the motor part 10 can be dissipated more efficiently. In addition, the length of the heat dissipating fin 86 in the circumferential direction is longer on a radially inner side than on a radially outer side. Accordingly, in a radially inward direction in which the length of the heat dissipating fin 86 in the circumferential direction is long, it is possible to reduce deflection of the motor part 10, and it is possible to increase the strength in response to deflection of the motor part 10 due to the heat dissipating fin 86. In addition, the length of the heat dissipating fin 86 in the circumferential direction is longer on a radially inner side than on a radially outer side. Accordingly, since the length of the heat dissipating fin 86 in the circumferential direction is shorter on the outside in the radial direction, the size of the electric oil pump 1 can be reduced on the outside in the radial direction.

(11) In addition, the motor housing 13 has the rib 87 connecting the plurality of heat dissipating fins 86. The rib 87 extends from the support 84*a*. Accordingly, the rib 87 serves as a path through which heat received by the support 84*a* is transferred to the heat dissipating fin 86 and it is possible to further increase a heat dissipation efficiency of the heat dissipating fins 86. In addition, the rib 87 connects the surface of a heat dissipating fin 86 in the axial direction and the surface of an adjacent heat dissipating fin 86 in the axial direction. Accordingly, it is possible to reduce swinging of the respective heat dissipating fins 86 in the axial direction, and it is possible to increase the strength of the heat dissipating fins 86 in the axial direction. Here, according to the strength of the heat dissipating fins 86 in the axial direction, swinging of the heat dissipating fins 86 in the axial direction is reduced.

(12) In addition, the heat dissipating fins 86 extend in a direction crossing the axial direction. Accordingly, it is possible to increase the strength thereof in the axial direction.

(13) In addition, the heat dissipating fins 86 extend in a direction orthogonal to the axial direction. Accordingly, it is possible to further increase the strength thereof in the axial direction.

(14) In addition, the electronic component 82*d* may be a power semiconductor element for controlling power that drives the motor part 10. Accordingly, heat generated from the power semiconductor element can be efficiently dissipated.

(15) In addition, the electronic component 82*d* may be an FET. Accordingly, heat generated from the FET can be efficiently dissipated.

(16) In addition, the electronic component 82*d* may be an IGBT. Accordingly, heat generated from the IGBT can be efficiently dissipated.

While the exemplary embodiments of the disclosure have been described above, the disclosure is not limited to such embodiments and various modifications and alternations within the spirit and scope of the disclosure can be made. These embodiments and modifications thereof are included in the scope and spirit of the disclosure and also included in the scope described in the claims and equivalents thereof.

Features of the above-described the exemplary embodiments and the modifications thereof may be combined appropriately as long as no conflict arises.

While the exemplary embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric oil pump comprising:
   a motor part having a shaft disposed along a central axis that extends in an axial direction;
   a pump part that is positioned on one side of the motor part in the axial direction and is driven by the motor part via the shaft and discharges oil; and
   a control part configured to control an operation of the motor part,
   wherein the motor part includes a rotor fixed to the other side of the shaft in the axial direction, a stator disposed to face the rotor, and a motor housing in which the rotor and the stator are accommodated,
   wherein the pump part includes a pump rotor attached to the shaft that protrudes from the motor part to one side in the axial direction and a pump housing having a housing part in which the pump rotor is accommodated,
   wherein the control part includes a plurality of electronic components and a board on which the plurality of electronic components are mounted,
   wherein the plurality of electronic components include a heat generating component,
   wherein the motor housing has a cylindrical part in which the rotor and the stator are accommodated and a plurality of heat dissipating fins that extend from the cylindrical part and radially outward from the motor part and extend from the cylindrical part in a circumferential direction of the cylindrical part,
   wherein the motor housing has a support that supports the plurality of heat dissipating fins, and has a rib extending from the support and connecting the plurality of heat dissipating fins,
   wherein the board has a first surface and a second surface,
   wherein the first surface is a surface that faces the plurality of heat dissipating fins and the support, and the second surface is a surface opposite to the first surface,
   wherein the heat generating component is mounted on the second surface,
   wherein the plurality of heat dissipating fins are disposed at intervals in the axial direction, and
   wherein the length of the plurality of heat dissipating fins in the circumferential direction is longer on a radially inner side than on a radially outer side when seen from the axial direction.

2. The electric oil pump according to claim 1, wherein the support extends in a radially outward direction.

3. The electric oil pump according to claim 1, wherein the support has a heat transfer part that extends toward the board.

4. The electric oil pump according to claim 3, wherein the board has a board through-hole that penetrates from the second surface to the first surface at a position that faces the heat generating component.

5. The electric oil pump according to claim 4, wherein the board through-hole has a thermally conductive member having thermal conductivity on its inner circumference.

6. The electric oil pump according to claim 5, wherein the thermally conductive member is a copper foil.

7. The electric oil pump according to claim 4, wherein the board has a heat dissipation member at a position of the board through-hole of the first surface.

8. The electric oil pump according to claim 7, wherein the heat dissipation member comes in contact with the heat transfer part.

9. The electric oil pump according to claim 1, wherein the plurality of heat dissipating fins extend in a direction crossing the axial direction.

10. The electric oil pump according to claim 9, wherein the plurality of heat dissipating fins extend in a direction orthogonal to the axial direction.

11. The electric oil pump according to claim 1, wherein the heat generating component is a power semiconductor element for controlling power that drives the motor part.

12. The electric oil pump according to claim 11, wherein the power semiconductor element is an FET a field effect transistor.

13. The electric oil pump according to claim 11, wherein the power semiconductor element is an IGBT insulated gate bipolar transistor.

* * * * *